May 30, 1967 R. E. O'BRIEN 3,321,807
UNIVERSAL MAGNETIC DIE PLATE
Filed July 7, 1965 3 Sheets-Sheet 1
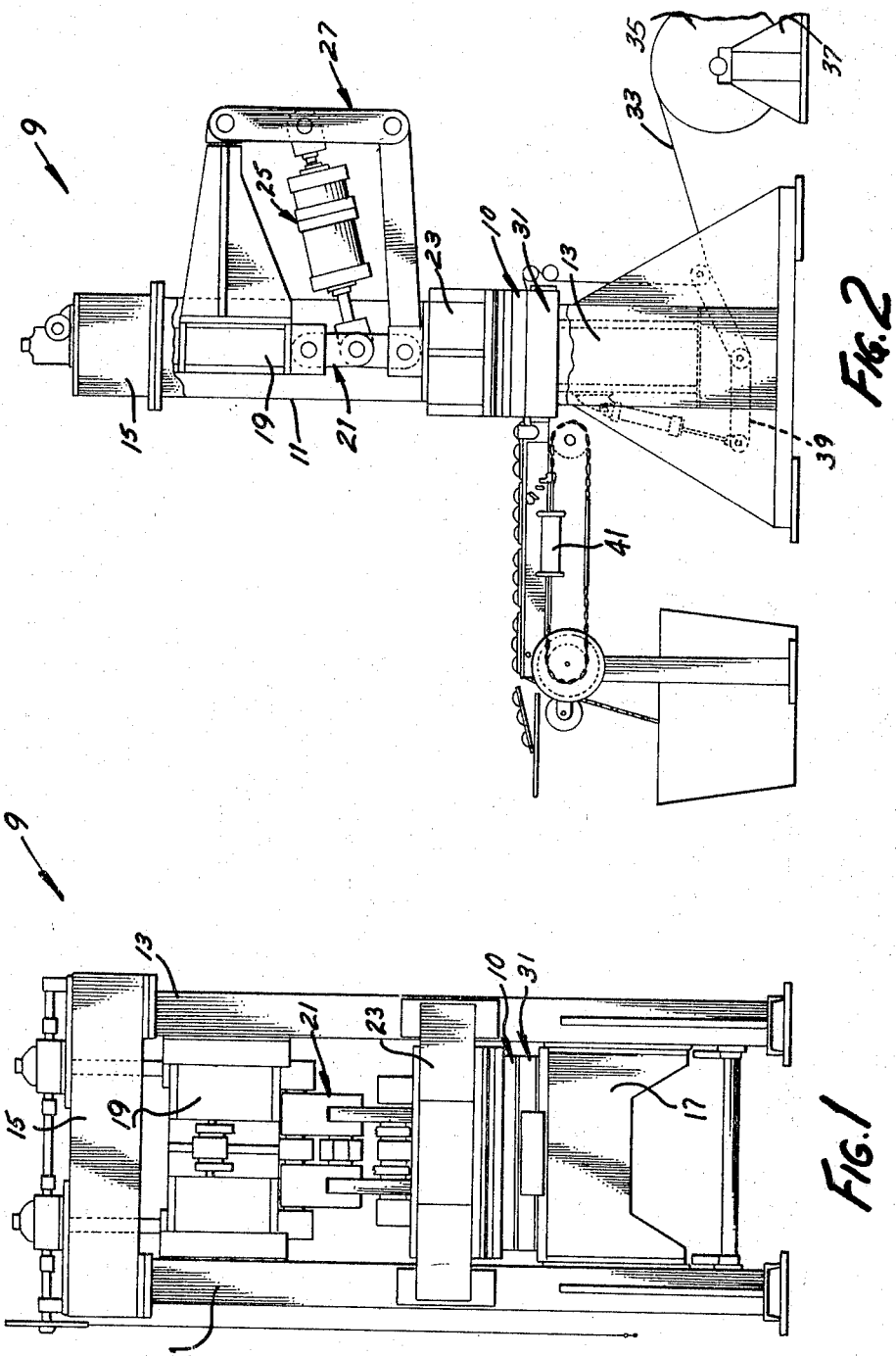
INVENTOR.
ROBERT E. O'BRIEN
BY
ATTORNEYS

INVENTOR.
ROBERT E. O'BRIEN
BY
ATTORNEYS

INVENTOR.
ROBERT E. O'BRIEN
BY
ATTORNEYS

United States Patent Office 3,321,807
Patented May 30, 1967

3,321,807
UNIVERSAL MAGNETIC DIE PLATE
Robert E. O'Brien, Grand Rapids, Mich., assignor to Kirkhof, Manufacturing Corporation, Grand Rapids, Mich., a corporation of Michigan
Filed July 7, 1965, Ser. No. 470,049
2 Claims. (Cl. 18—35)

This invention relates to press apparatus for forming three dimensional articles from a sheet of plastically deformable material, and particularly relates to forming die and die retention platen means for forming press equipment.

Press equipment for forming three dimensional articles from sheet material by pressure, physical and/or pneumatic, normally has a bed and a shiftable head upon which cooperative forming die platens are mounted. These die platens, which are reciprocated toward and away from each other, are each conventionally an integral heavy unit, being specially machined and formed. One is mounted to the head, and a cooperative one is mounted to the base. These may constitute physically cooperative matching dies, and/or may employ pneumatic pressure differential and/or heat, depending upon the characteristics of the material being deformed and the size and characteristics of the resulting articles, among other factors.

The nature and configuration of the particular platen die surfaces varies considerably with the type of forming process, the type of article formed, and the material from which it is formed. The integral die platen units are each normally bolted or clamped to the press bed and ram so as to be removable. The platens are heavy and very thick to withstand the forces imparted to them. Normally, each die platen has a plurality of like die surfaces at spaced intervals on its forming face area, to enable the formation of as many articles as possible with each stroke of the press. Because of their size and weight, these die platens are difficult to remove, transport and replace.

Article manufacturers who produce articles on forming presses accumulate an extensive inventory of these large heavy die platens. With each change of articles to be produced, the heavy platens are unbolted or unclamped, lowered out of the press by power hoist equipment, carted to storage, and replaced by other platens which are hoisted into place with power hoist equipment, and bolted or clamped to the bed or ram.

Obviously, the capital investment in die platens is tremendous. Further, the task of exchanging the die platens is substantial, requiring significant down-time, effort and skill.

Versatility in operation is severely limited to the use of the exact spacing and number of die faces on each preformed special platen.

It is an object of this invention to provide a unique die forming apparatus for presses, that enables die changes to be made quickly and easily, even by one man.

Another object of this invention is to provide a versatile forming die assembly that prevents the necessity of storing and moving a large inventory of heavy thick expensive integral die platen units. With the novel apparatus, the inventory is composed only of small, lightweight, individual die elements which can be mounted in a selected spacing pattern and number.

Another object of this invention is to provide a forming die assembly that prevents scrapping and loss of entire expensive platen units. This can be done, moreover, in an easy, quick, manual operation when necessary.

Another object of this invention is to provide a die retaining platen that is highly versatile and generally universal in its capacity to mount any selected dies, in a selected pattern of die elements.

These and several other objects of this invention will become apparent upon studying the following specification in conjunction with the drawings in which:

FIG. 1 is a front elevational view of a press embodying the invention;

FIG. 2 is a side elevational view of the press assembly;

Figure 3:
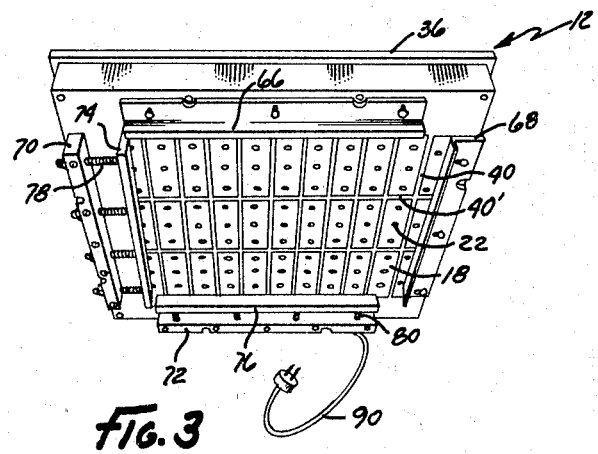
FIG. 3 is a perspective view of the bottom side of one of the novel die retention platens, with the die elements removed.

Referring now specifically to FIGS. 1 and 2 of the drawings, the press assembly 9 basically includes a pair of spaced, vertical support columns 11 and 13 with an upper cross beam 15 between the upper ends and a bed 17 between the lower ends thereof. Suspended beneath cross beam 15 is a head 19. A toggle linkage 21 suspends a vertically reciprocating ram 23 beneath head 19. Power cylinder means 25 extending between the central pivot of toggle linkage 21 and the stabilizer linkage 27 extends and contracts the toggle linkage to lower and raise the press ram. Attached to the underside of ram 23 is the upper platen assembly 10. Cooperative therewith is the lower platen assembly 31 attached to the bed 17. The plastic, deformable web 33 is unwound from a suitable supply 35 mounted on supports 37 by oscillating means 39, and pulled through the press with the formed articles by suitable reciprocating feed means 41.

Figure 6:
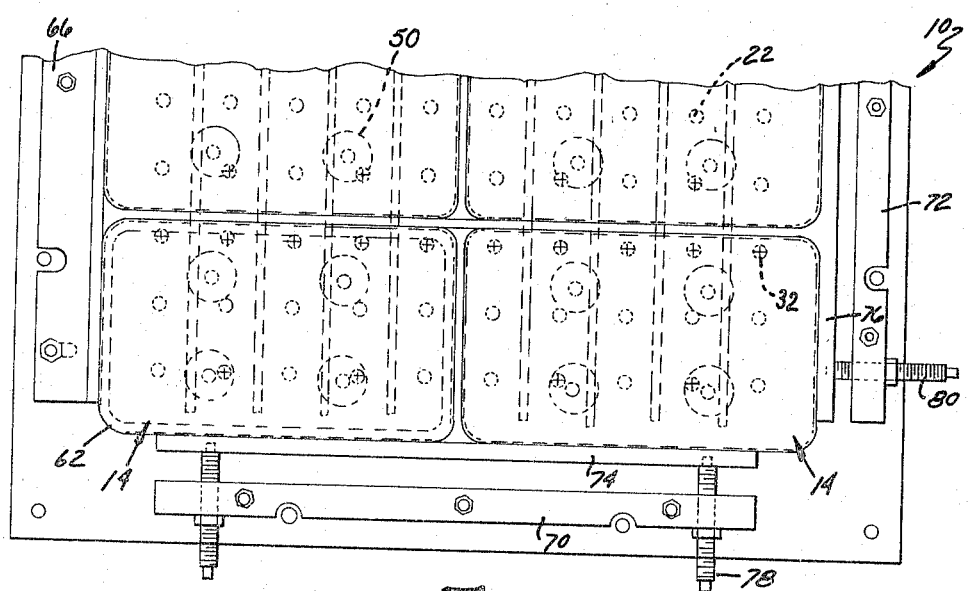
FIG. 6 is an enlarged bottom view of the assembly of retention platen and plurality of die elements in FIG. 5.
Figure 5:
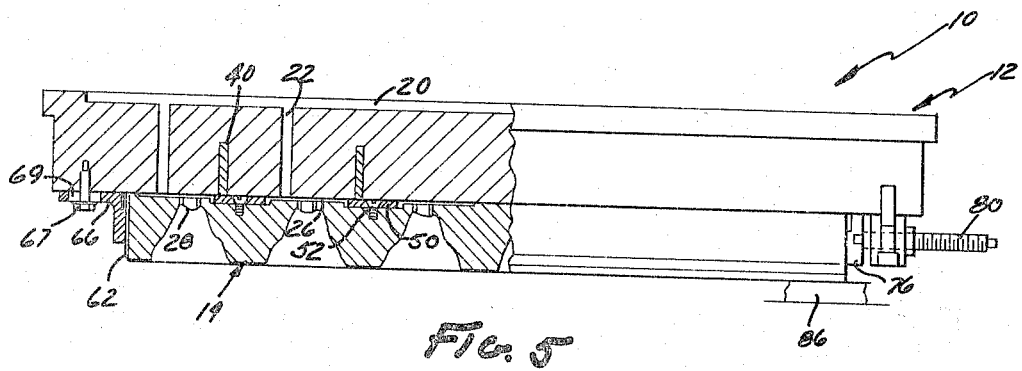
FIG. 5 is a side, elevational, partially sectioned view of the mounting unit in FIGS. 3–5, with a plurality of die elements inserted.

The upper platen forming assembly 10 (FIG. 5) is composed of a generally universal die retention means 12 and a plurality of individual selected die elements 14, 14', etc. (FIGS. 5 and 6).

Figure 4:
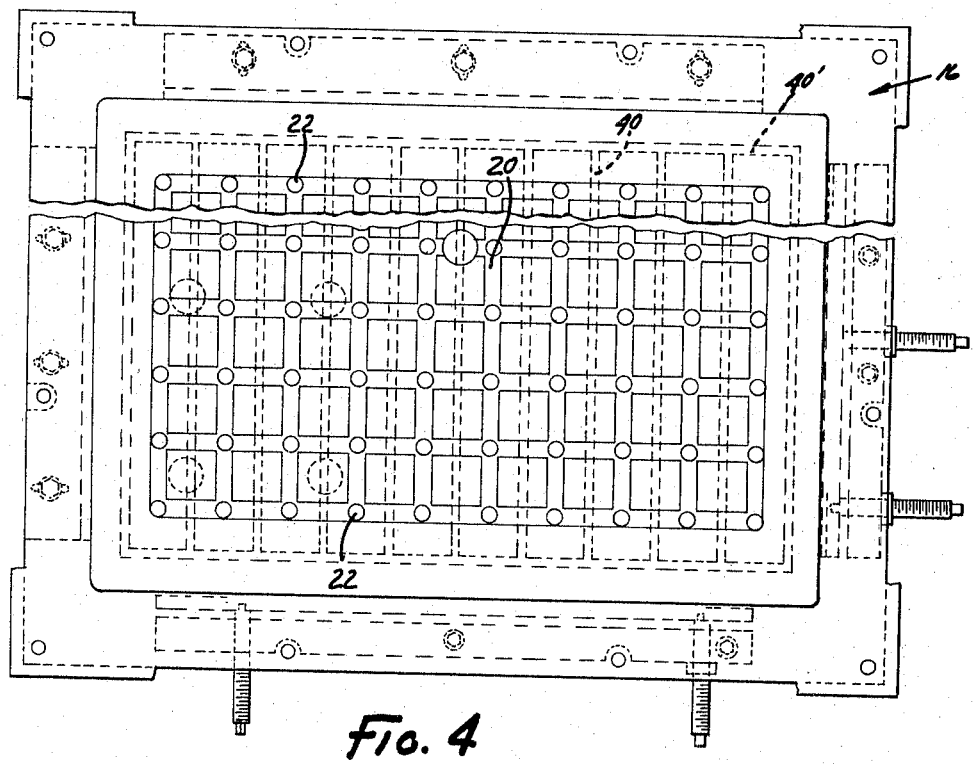
FIG. 4 is a plan enlarged view of the top side of the unit in FIG. 3.

The die retention platen unit 12 is generally rectangular in configuration, in its normal form, having a back (upper) surface 16 adapted to be mounted to the bed or the head of the press. It has a die receiving surface 18 on opposite surface 16. The back surface 16 has a plurality of passages 20 (FIGS. 4 and 5) which communicate together and with a plurality of passage orifices 22 extending through the platen support to the die receiving face 18, to communicate with the die insert element back sides as shown by the illustrative passage orifice in FIG. 5. A space 26 is provided between the die insert elements and the platen support to allow pneumatic action through tiny passages 28 in the die elements themselves (FIG. 5). These passages are in a pattern over the extent of the die, with suitable ones of the orifices being plugged by the insert plugs 32 (FIG. 6) in any particular setup.

Each platen 12 can be mounted to the head of a press (or to the bed) by clamping the unit around its peripheral mounting flange 36. When so clamped and sealed around its peripheral edge, the passages communicate with a suitable pneumatic supply and vacuum pump (not shown).

The die receiving face means 18 on the platen unit has special retention means. Specifically, a pattern of a plurality of elongated magnetizable elements 40 and 40' are embedded in two directions, with the elements in each being in spaced and parallel relation over the face. These magnetizable elements are magnetized with the exposed elongated edges at surface 18 comprising pole faces of alternate poles so as to form optimum magnetic action toward magnetizable means contacted against this face.

The particular configuration, size and nature of the individual die elements attached to this retention means will vary considerably, depending upon the articles to be formed. An illustrative set of dies is illustrated at 14, 14', etc. in FIGS. 5 and 6. Along the back surface of each die element is cooperative magnetizable means positioned to contact the platen elements 40 and 40'.

These die elements are used for forming plastic articles out of the thermoplastic webbing. They are composed of aluminum. A plurality of magnetizable elements such as discs 50 are mounted to the back side of the die elements in slightly recessed cavities by screws 52. They are coincident with the magnetizable pattern on the die retention platen. The cooperative contact of the two magnetizable means, one on the platen and the other on the dies, creates a magnetic circuit when one of these is magnetized. The magnetic circuit is sufficiently powerful to hold the die elements in position for clamping, but also allows the die elements to be pulled loose manually. A plurality of selected dies can be arranged in a desired pattern on the face of this die retention platen, by positioning them manually.

Each of these dies is shown to have a peripheral sealing and creasing blade 62. This can be varied, depending upon the construction of the individual dies selected for any particular operation. The die elements have flat side faces to be secured in stable operating relationship on the under side of the platen by lateral clamping retention means. This clamping means is provided on the four sides of the platen, with the opposite clamps being cooperative. These clamping means also comprise alignment means for die elements.

This clamping means, in the preferred form, includes slightly adjustable, anchored clamping flanges or bars 66 and 68 on two adjacent sides, and a pair of opposite, cooperative, highly adjustable, clamping means. These clamping means have fixed bars 70 and 72, and shiftable clamp means 74 and 76, respectively, with threaded stud adjustor means 78 and 80 respectively therebetween. These clamping means are laterally shiftable across the face of the die receiving platen, to squeeze and bind a plurality of die elements into a tightly retained relationship.

The magnetic retention means, therefore, effectuates a partial retention force normal to the face of the platen, and the clamping means effectuates a clamping action transverse to the face to secure them together in operative relationship. Bars 66 and 68 can be adjusted slightly in their mounted relationship because bolts 67 extend through slotted openings 69.

When the particular die elements, such as those illustrated at 14 and 14' are to be mounted, they are merely placed one at a time with the back side with its magnetizable elements 50 against the pole faces of the magnetic pattern in the platen face. The die elements are magnetically retained in suspended relationship. After all of the elements are mounted roughly in the pattern in which they are to be used, the clamping means on the opposite sides are tightened by turning the adjusting tightening studs. The die elements are thus squeezed together into tight binding relationship.

The die assembly is very versatile, generally universal, and adaptable to different dies. Change over between operations on different type articles is rapid, with minor down-time, and minimum labor. This die assembly can cooperate with a lower platen that has matching die elements, or that is a fixed flat surface like that shown at 31 in FIGS. 1 and 2.

Various additional advantages may occur to those in the art upon studying the foregoing preferred form of this particular inventive unit. Also, various changes in structural detail may be provided without departing from the unique concept presented. Therefore, the invention is intended to be limited only by the scope of the appended claims and the reasonably equivalent structures to those defined therein.

I claim:
1. Forming die apparatus comprising: a press platen assembly having a die receiving surface area; a plurality of die elements, each having surface area cooperatively engageable with said die receiving surface area; the surface area of each die element being a fraction of said platen surface area, to enable said platen to engage a plurality of said die elements simultaneously; magnetizable means anchored to said platen at said die receiving surface area; magnetizable means on each of said die elements at its surface area; one of said magnetizable means between each die element and said platen being magnetized; said platen magnetizable means being in a pattern over said die receiving surface area, the portions of said pattern being spaced closer than the size of said die surface area, to create at least one magnetic circuit between said platen and each of said die elements to retain the die elements peripheral clamping and alignment means cooperative with said platen and said die elements to retain said die elements in particular relationship to said platen and to each other.

2. Forming die apparatus comprising: a platen having a die receiving surface area; a plurality of die elements, each having surface area cooperatively engaged with said die receiving surface area; magnetic die retention means in one of (a) said platen, and (b) each of said lie elements, having poles at said surface areas; magnetically responsive means in the other of (a) said platen, and (b) each of said die elements, adjacent said surface areas and cooperative with said retention means to retain said die elements on said receiving surface area; and peripheral clamping and alignment means cooperative with said platen and said die elements to retain said die elements in particular relationship to said platen and to each other.

References Cited
UNITED STATES PATENTS

| | | | |
|---|---|---|---|
| 2,779,057 | 1/1957 | Graham et al. | |
| 3,107,396 | 11/1963 | Fowler et al. | 18—19 |
| 3,156,012 | 10/1964 | Hirtz | 18—19 |
| 3,190,945 | 6/1965 | Diamond | 18—19 XR |

FOREIGN PATENTS

| | | |
|---|---|---|
| 1,374,692 | 8/1964 | France. |
| 556,396 | 10/1943 | Great Britain. |

WILLIAM J. STEPHENSON, *Primary Examiner.*